May 4, 1943.　　　　　G. WEBB　　　　2,318,348
GUN MOUNT
Filed April 11, 1939　　　3 Sheets-Sheet 1

Inventor
George Webb
By S. Jay Teller
Attorney

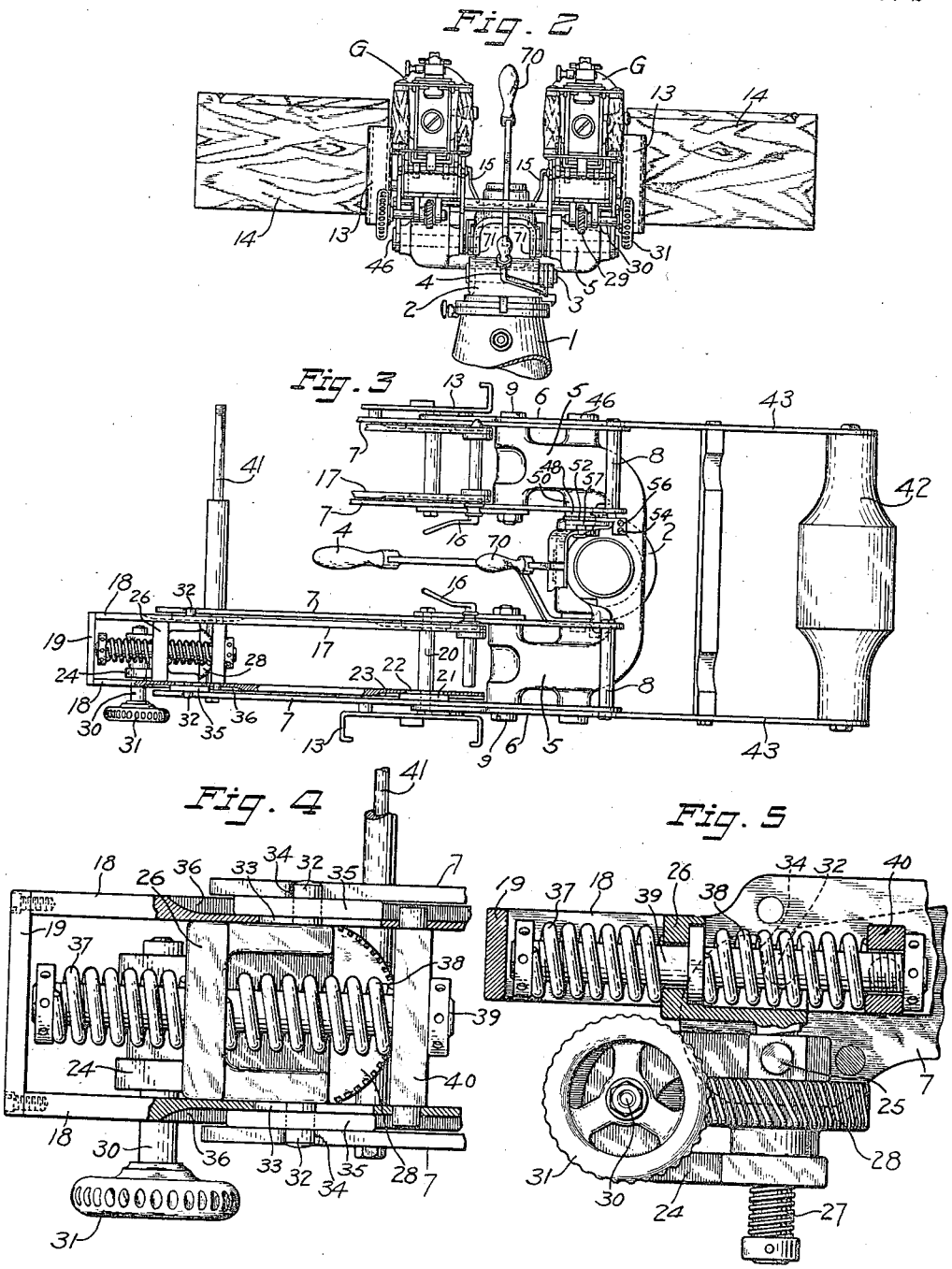

May 4, 1943.  G. WEBB  2,318,348
GUN MOUNT
Filed April 11, 1939   3 Sheets-Sheet 3
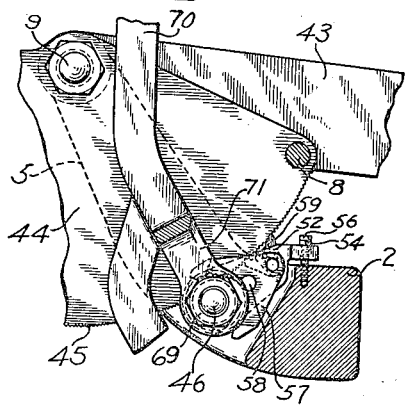
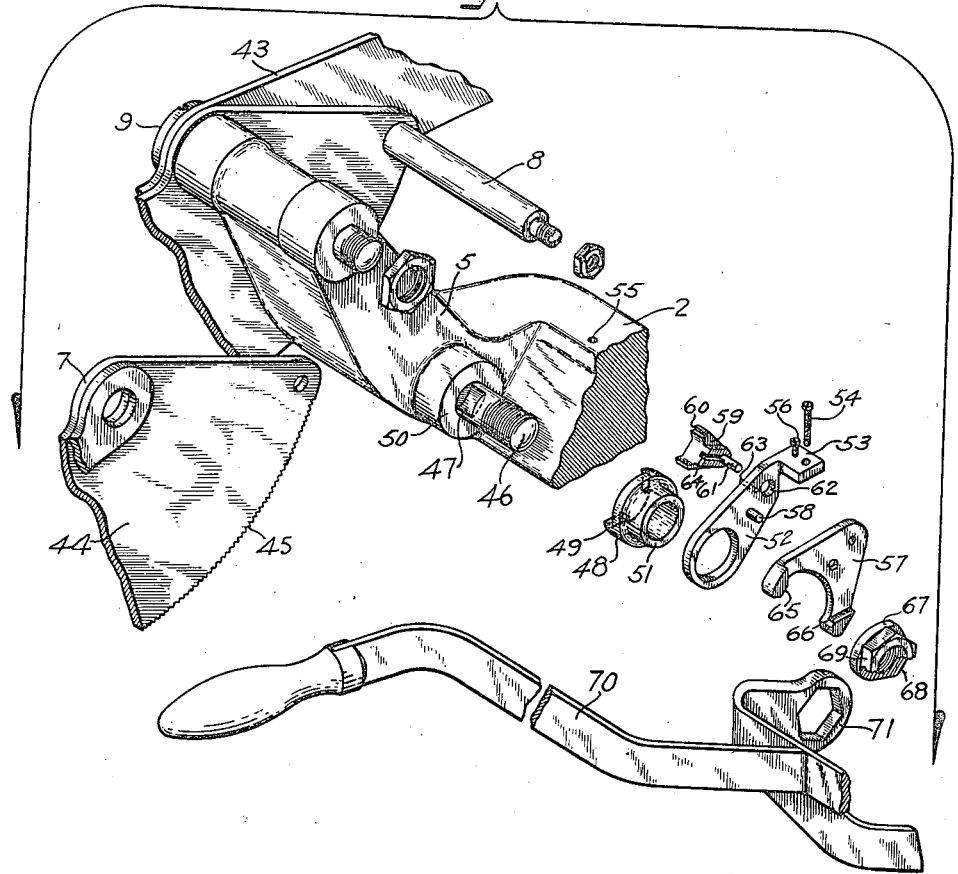
Inventor
George Webb
By S. Jay Teller
Attorney Patented May 4, 1943

2,318,348

UNITED STATES PATENT OFFICE 2,318,348

GUN MOUNT

George Webb, Hartford, Conn., assignor to Colt's Patent Fire Arms Manufacturing Company, Hartford, Conn., a corporation of Connecticut Application April 11, 1939, Serial No. 267,283

4 Claims. (Cl. 89—37)

The primary object of the invention is to provide a mount adapted to support a plurality of machine guns in such a manner that the guns may have free universal movement as a unit or may be locked as a unit in adjusted positions.

Another object is to provide a mount of the above character with means for adjusting the angle of fire of one gun with respect to that of another.

A further object is to provide a mount of the above character in which operating handles for the means for locking the guns in adjusted positions are positioned between the guns at all times so as to be always readily accessible.

Other objects and advantages of the invention will be apparent from this specification to those skilled in the art.

In the accompanying drawings I have shown one embodiment of the invention, but it will be understood that the drawings are intended for illustrative purposes only and are not to be construed as defining or limiting the scope of the invention, the claims forming a part of this specification being relied upon for that purpose.

In the drawings:

Fig. 2 is a fragmentary rear elevation of the mount shown in Fig. 1.

Fig. 3 is an enlarged fragmentary plan view of the mount.

Fig. 4 is an enlarged fragmentary plan view of part of the adjusting mechanism.

Fig. 5 is an elevational view, partly in section, of the mechanism shown in Fig. 4.

Fig. 6 is an enlarged fragmentary view of the cradle locking mechanism.

Fig. 7 is an exploded view of the mechanism shown in Fig. 6.

Figure 1:
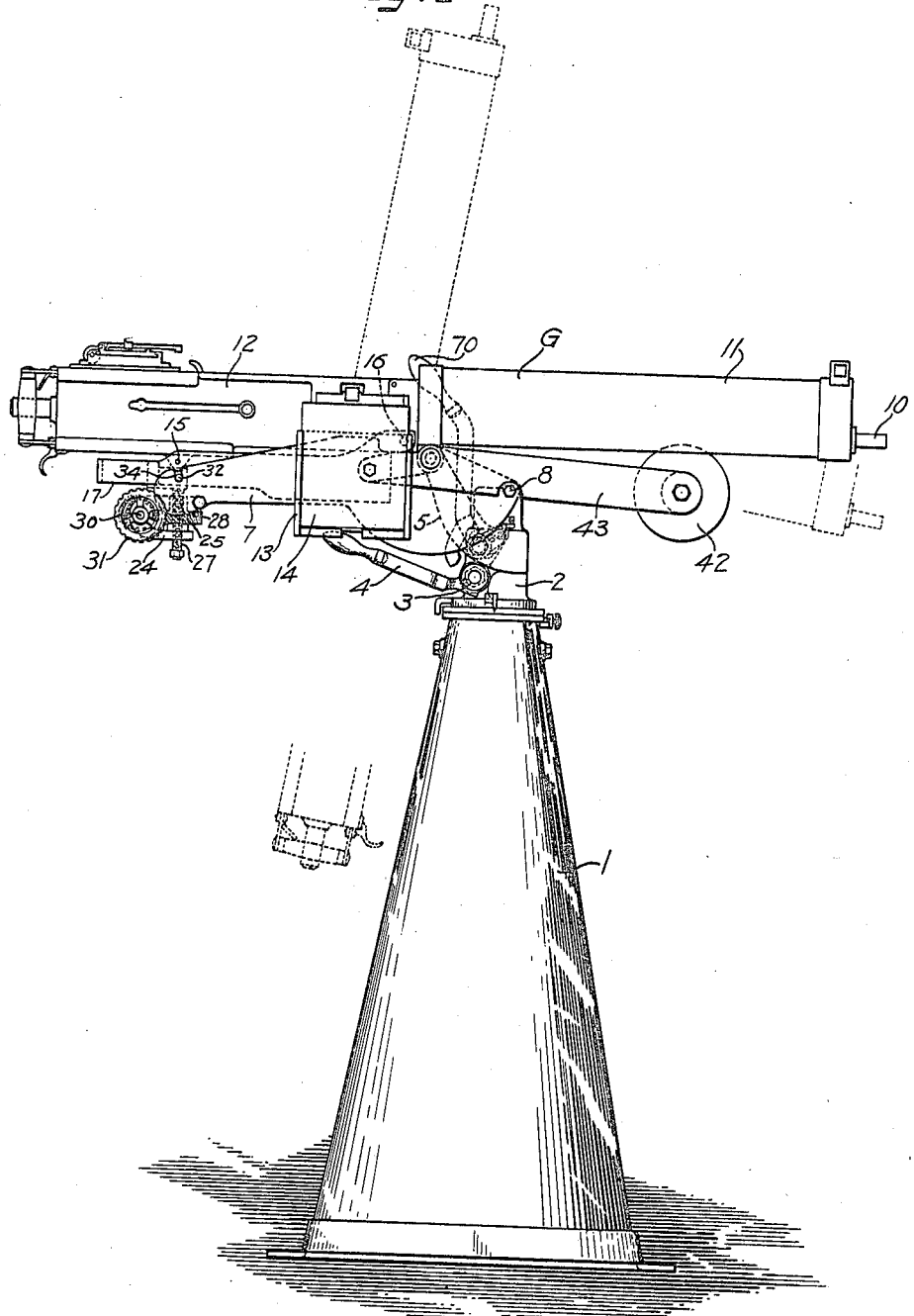
Fig. 1 is a side elevation of a mount embodying the principles of the invention.

For the purposes of this specification I have shown a mount embodying the invention and adapted to support two machine guns; however, it should be understood that the invention is not limited to mounts adapted to support but two guns.

A mount incorporating the principles of the invention includes a support which may be of any desired detailed construction. The support illustrated comprises a pedestal 1 and a swivel head 2 mounted on the pedestal for rotation about a vertical axis. Means, generally indicated at 3, are provided for locking the swivel head in any desired position and an operating handle 4 therefor is preferably located between the machine guns G. This locking means may be of any of the types now commonly used in machine gun mounts and no detailed description thereof is deemed necessary. The swivel head 2 includes a plurality of arms 5 each adapted to have a cradle 6 pivotally secured thereto for vertical angular movement, the phrase "vertical angle" and its derivatives being used herein with reference to an angle lying in a plane extending parallelly to the pivotal axis of the swivel head 2.

So far as the broader aspects of the invention are concerned, the cradles may be of any desired type, however, I have illustrated the form which I now consider preferable. Each cradle comprises two parallel side plates 7 located on opposite sides of an arm 5, the plates being suitably held in spaced relationship and tied together by members 8. A horizontal pivot pin 9 which extends through bearing apertures in the side plates and in the arm 5 serves to provide for vertical angular movement of the cradle, which movement in conjunction with the pivotal movement of the swivel head provides for universal movement of the cradle.

The invention is not limited to use in conjunction with any particular type of gun but I have illustrated machine guns such as shown in the United States patent to J. M. Browning No. 1,293,021. Each gun includes a barrel 10, water jacket 11, and breech casing 12. Brackets 13 secured to the side plates 7 are provided for supporting ammunition boxes 14. While the guns may be directly carried by the side plates 7, they are preferably secured by pins 15 and 16 to saddles 17 which are pivotally carried by the side plates 7 in such a manner as to provide for the vertical angular adjustment of the line of fire of one gun with respect to that of another. The saddles are preferably constructed and related to the remainder of the cradles in the manner illustrated. Each saddle comprises side members 18 connected at their rearward ends by a plate 19. A pin 20 having bearing shoes 21 thereon extends between the cradle side plates 7 and through elongated apertures 22 in the saddle side members 18 adjacent the forward ends thereof, the shoes 21 being slidable in grooves 23 in the side members. A U-shaped member 24 is pivotally supported by the side plates 7 adjacent their rearward ends by trunnions 25 on the member. Another member 26 is mounted on the upper end of a screw 27, the latter being longitudinally movable by means of a helical gear 28 and another helical gear 29 (Fig. 2) carried by a shaft 30 which may be rotated by a hand wheel 31. The member 26 is provided with lugs 32 extending through longitudinally extending elongated slots 33 in the saddle side members and received in recesses 34 in the side plates 7 to prevent movement of the member 26 longitudinally of the side plates. The lugs 32 carry shoes 35 which are slidable in grooves 36 in the saddle side members. With this construction it is apparent that the saddle can move longitudinally relatively to the cradle side plates and can also be angularly adjusted relatively thereto about the axis of pin 20.

The longitudinal movement of the saddles absorbs some of the bodily recoil of the guns while springs 37 and 38 mounted on a rod 39 which extends through both member 26 and an abutment 40 carried by the saddle side members function to further absorb this recoil.

A tie rod 41 is preferably provided to connect the cradles so that they swing as a unit about the axes of pivot pins 9. Even though the cradles are inflexibly tied together, the vertical angles of fire of the several guns may be relatively adjusted within limits by the hand wheels 31 so as to permit adjustment of the vertical angular dispersion of fire if desired. A counterweight 42 is preferably provided for facilitating the training of the guns on a rapidly moving target such as an airplane, the counterweight being secured to forwardly projecting extensions 43 of the cradle side plates 7.

The free vertical angular movement of the guns provided by the construction so far described is very desirable when firing at moving targets such as aircraft. However, it is also desirable to be able to lock the cradles in various vertical angular positions. I have shown the locking means which is now deemed preferable, although other means may be used if desired.

Referring now to Figs. 3, 6, and 7, each of the inner cradle side plates 7 includes a segmental portion 44 provided with teeth 45. A bolt 46 extends through arm 5 of the swivel head 2 adjacent the teeth 45 and is recessed at 47 to accommodate the lower edge of segment 44. A bushing 48 suitably recessed at 49 to accommodate the lower edge of segment 44 is slidably mounted on bolt 46 and is adapted to frictionally engage and clamp the segment against a boss 50 on the swivel head when axial pressure is applied to the bushing. This clamping action also tends to dampen any vibrations set up in the cradle when the gun is being fired. The bushing includes a collar portion 51 upon which an arm 52 is rotatably adjustable for reasons which will be apparent hereinafter. The means for holding the arm 52 in adjusted position may take any desired form but in the illustrated construction the arm is provided with an offset portion 53 having a hole therethrough for loosely receiving a screw 54 which is threadedly engaged in a hole 55 in the swivel base and also having a threaded hole therethrough for receiving another screw 56. The head of screw 54 prevents upward swinging movement of arm 52 while screw 56 prevents downward movement. A rocker plate 57 is pivotally supported by a pivot pin 58 carried by the arm 52 and a clamping member 59 having teeth 60 thereon engageable with the teeth 45 is positioned on the opposite side of the arm 52 from the plate 57. Clamping member 59 is pivotally attached to plate 57 by pin 61 which extends through a relatively large hole 62 in arm 52, the hole allowing of limited pivotal movement of the plate 57 and member 59 relatively to arm 52. A guide pin 63 and guide groove 64 cooperate to hold the member 59 in a substantially upright position with respect to arm 52. Projections 65 and 66 on plate 57 are alternatively engageable by cam surfaces 67 and 68 on a nut 69 as the nut is unscrewed or advanced along the threads on bolt 46.

It should, of course, be understood that each cradle is provided with a frictional and positive locking mechanism of the type just described. A single member is preferably provided for simultaneously operating the two locking mechanisms. Such a member is shown at 70, the member being bifurcated to form two wrench portions 71 which are engageable with the nuts 69. The operating member 70 is preferably located between the cradles so as to be out of the way but still be readily accessible.

The cradle locking mechanism is shown in its locking position in Fig. 6. If the operating member 70 is swung downward, nut 69 will be rotated in a counter-clockwise direction to relieve the axial pressure on bushing 48 to thus relieve the frictional clamping of segment 44 against boss 50. This rotation of nut 69 also moves cam surface 68 out of engagement with projection 66 and moves cam surface 67 into engagement with projection 65, thus lifting the rearward end of plate 57 and moving the teeth 60 on member 59 out of locking engagement with the teeth 45 on the cradle side plates. The cradles may now be freely swung as a unit about pivots 9. If the member 70 is now swung upward, nut 69 will be rotated to frictionally clamp the cradle side plates and to move the teeth 60 into positive locking engagement with teeth 45. The adjusting screws 54 and 56 serve to lift or lower the forward end of arm 52 which in turn determines the extent of engagement of teeth 45 and 60.

By having the locking mechanism operating handles 4 and 70 carried by the swivel head 2 and also by positioning these handles between the guns, they are at all times readily accessible to the gunner as they are always immediately in front of him regardless of the horizontal angular position of the guns. Furthermore, due to their location they are substantially protected by the guns from being accidentally struck and knocked from their desired positions and there is no danger of their obstructing the actions of the gunner's assistant when putting a new ammunition box in place.

Various changes in details within the scope of the appended claims will be apparent to those skilled in this art.

What I claim is:

1. A machine gun mount comprising in combination, a support, a plurality of gun mounting cradles pivotally carried by said support for vertical angular movement, a separate locking means for each of the cradles operable to hold each of the cradles in adjusted vertical angular positions or to permit free vertical angular movement thereof, and a single member for simultaneously operating all the said locking means.

2. A machine gun mount comprising in combination, a support, a plurality of gun mounting cradles pivotally carried by said support for vertical angular movement, a separate locking means for each of the cradles operable to hold each of the cradles in adjusted vertical angular positions or to permit free vertical angular movement thereof, and a single member for simultaneously operating all the said locking means, each of said locking means comprising a member movable into and out of frictional clamping engagement with a cradle and a member movable into and out of positive locking engagement with a cradle.

3. A machine gun mount comprising in combination, a support, two gun mounting cradles pivotally carried by said support for angular movement about vertical and horizontal axes, clamping means for holding the cradles in adjusted horizontal angular positions and including an operating handle positioned between the mounting cradles, a separate locking means for each of the cradles operable to hold each of the cradles in adjusted vertical angular positions or to permit free vertical angular movement thereof, and a single member for simultaneously operating said locking means, said member having a handle positioned between the two mounting cradles.

4. A machine gun mount comprising in combination, a support including a swivel head pivotally movable about a vertical axis, two gun mounting cradles pivotally carried by said swivel head and angularly movable thereon about a horizontal axis, clamping means for holding the swivel head in adjusted horizontal angular positions and including an operating handle, a separate locking means for each of the cradles operable to hold each of the cradles in adjusted vertical angular positions or to permit free vertical angular movement thereof, and a single operating member for simultaneously controlling said locking means, said operating handle and said single operating member being carried by said swivel head and being positioned between the two mounting cradles at all times.

GEORGE WEBB.